US012641638B2

(12) United States Patent
Sehgal et al.

(10) Patent No.: US 12,641,638 B2
(45) Date of Patent: May 26, 2026

(54) METHOD AND APPARATUS FOR SPATIAL REUSE FOR A COMMUNICATION SYSTEM

(71) Applicant: Samsung Electronics Co., Ltd., Suwon-si (KR)

(72) Inventors: Abhishek Sehgal, Plano, TX (US); Ahmed Atef Ibrahim Ibrahim, Plano, TX (US); Hao Chen, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 18/177,706

(22) Filed: Mar. 2, 2023

(65) Prior Publication Data

US 2023/0284269 A1 Sep. 7, 2023

Related U.S. Application Data

(60) Provisional application No. 63/316,844, filed on Mar. 4, 2022.

(51) Int. Cl.
| | |
|---|---|
| *H04W 74/0808* | (2024.01) |
| *H04W 16/02* | (2009.01) |
| *H04W 84/12* | (2009.01) |

(52) U.S. Cl.
CPC ....... *H04W 74/0808* (2013.01); *H04W 16/02* (2013.01); *H04W 84/12* (2013.01)

(58) Field of Classification Search
CPC ............. H04W 74/0808; H04W 16/02; H04W 84/12; H04W 16/04; H04W 16/14

USPC ......................................................... 370/338
See application file for complete search history.

(56) References Cited

U.S. PATENT DOCUMENTS

| | | | | |
|---|---|---|---|---|
| 10,666,368 | B2 * | 5/2020 | Barriac ................ | H04W 16/10 |
| 10,701,730 | B2 | 6/2020 | Kim et al. | |
| 10,986,517 | B2 | 4/2021 | Oteri et al. | |
| 11,212,750 | B1 * | 12/2021 | Ali ........................ | H04W 52/18 |
| 11,357,047 | B2 | 6/2022 | Pandian et al. | |
| 11,997,712 | B2 * | 5/2024 | Lv ........................ | H04B 17/318 |
| 2017/0245224 | A1 | 8/2017 | Barriac et al. | |
| 2020/0288323 | A1 * | 9/2020 | Silverman ......... | H04W 74/0825 |
| 2020/0404705 | A1 * | 12/2020 | Coffey .................... | H04B 1/04 |
| 2021/0219338 | A1 | 7/2021 | Lanante et al. | |
| 2021/0360691 | A1 * | 11/2021 | Haider ................. | H04B 17/336 |
| 2021/0360694 | A1 * | 11/2021 | Pandian ............. | H04W 72/541 |

* cited by examiner

*Primary Examiner* — Chi Tang P Cheng
*Assistant Examiner* — Michael Wayne Maddox

(57) ABSTRACT

Methods and apparatuses for enabling reuse, by a node in a basic service set (BSS), of a channel medium that is in use by devices of an overlapping BSS (OBSS) in a wireless local area network. A method of wireless communication performed by a first node includes the steps of obtaining, based on transmissions from other nodes in at least one of a BSS or an OBSS, network context information for a network environment around the first node, updating an OBSS packet detection (PD) threshold for spatial reuse (SR) based on the network context information, and performing, for a transmission to one of the other nodes in the BSS, an SR clear channel assessment (CCA) using the updated OBSS PD threshold for detection of packets transmitted by the nodes in the OBSS.

18 Claims, 12 Drawing Sheets

METHOD AND APPARATUS FOR SPATIAL REUSE FOR A COMMUNICATION SYSTEM

CROSS-REFERENCE TO RELATED APPLICATION(S) AND CLAIM OF PRIORITY

This application claims priority under 35 U.S.C. § 119(e) to U.S. Provisional Patent Application No. 63/316,844 filed on Mar. 4, 2022, which is hereby incorporated by reference in its entirety.

TECHNICAL FIELD

This disclosure relates generally to throughput and efficiency in wireless communications systems. Embodiments of this disclosure relate to methods and apparatuses for enabling reuse of a channel medium that is in use by devices of a neighboring basic service set in a wireless local area network communications system.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

With the standardization process of the next generation IEEE 802.11 WLAN (i.e., the IEEE 802.11ax amendment) entering the final stage, the IEEE802.11ax amendment is drawing attention of the information technology industry. It introduces new features for improving peak throughput and efficiency in an environment crowded by many 802.11 devices, example environments being airports, stadiums, and other enterprise networks. WFA (Wi-Fi alliance) has already launched the WI-FI 6 certification program for guaranteeing interoperability between certified products implementing the IEEE 802.11ax amendment. In the market, device manufacturers are already starting to release WI-FI 6 certified smart mobile devices.

Earlier IEEE 802.11ax amendments have relied on fixed Clear Channel Assessment (CCA) thresholds, e.g., fixed CCA thresholds associated with the Basic Service Set (BSS) medium and other fixed CCA thresholds associated with the Overlapping BSS (OBSS) medium. The current IEEE 802.11ax amendment entering the final stage allows the use of adaptive CCA thresholds. Specifically, the IEEE 802.11ax amendment entering the final stage introduces BSS Coloring as a scheme to allow early detection of OBSS transmission and Spatial Reuse (SR) through adaptive CCA thresholds with Transmission Power Control (TPC) to increase spectral efficiency in dense WI-FI deployments.

In SR, a station (STA) can transmit in parallel (e.g., simultaneously, although not necessarily synchronously) to other physical layer protocol data units (PPDUs) being transmitted from OBSSs. This is accomplished, in part, by using different CCA thresholds for the BSS medium and the OBSS medium. Specifically, the CCA thresholds used for OBSS packet detection are higher than the CCA thresholds used for BSS packet detection. This enhances channel access and increases transmission opportunities for STAs in a dense network (e.g., that has many access points (APs)).

For a particular medium (e.g., the OBSS medium or the BSS medium), the IEEE 802.11ax amendment specifies the use of two separate CCA thresholds when listening to the medium to determine whether or not it is IDLE. One CCA threshold, the preamble (or packet) detection (PD) threshold, is used to identify any 802.11 preamble transmissions from another transmitting 802.11 radio. The preamble (which is used for synchronization between transmitting and receiving 802.11 radios) is a component of the physical layer (pHY) header of 802.11 frame transmissions. The PD threshold is statistically around 4 dB signal-to-noise ratio (SNR) for most 802.11 radios to detect and decode an 802.11 preamble. That is, an 802.11 radio can usually decode any incoming 802.11 preamble transmissions with a received signal power at about 4 dB above the noise floor. Another CCA threshold, the energy detection (ED) threshold, is used to detect any other type of radio frequency (RF) transmissions during the clear channel assessment. The ED threshold is specified to be 20 dB higher than the PD threshold.

The IEEE 802.11ax specification defines the PD threshold as −82 dBm and the ED threshold as −62 dBm for a 20 MHz channel, with a 3 dB increment for every doubling of channel bandwidth. Illustratively, these CCA thresholds are used for sensing a particular medium in the following manner: If an 802.11 preamble is detected by a STA in a network, then the STA uses the PD threshold to determine whether or not the medium is IDLE (where a preamble with SNR greater than or equal to the PD threshold indicates a non-idle medium, and a preamble with SNR below the PD threshold indicates an IDLE medium). In the absence of an 802.11 preamble, the STA resorts to using the ED threshold to determine whether or not the medium is IDLE. (where a preamble-free RF transmission with SNR greater than or equal to the ED threshold indicates a non-idle medium, and a preamble-free RF transmission with SNR below the PD threshold indicates an IDLE medium).

BSS Coloring allows the STA to identify the current transmission, based on a BSS color indicated in the PHY header of the incoming transmission, as an inter-BSS or intra-BSS transmission. The STA can then adjust the PD threshold for the inter-BSS transmission and transmit over the ongoing transmission. This mode of operation is called Overlapping Basic Service Set-Packet Detect (OBSS PD) based SR, or simply OBSS PD SR. If the STA ignores the inter-BSS transmission based on OBSS PD SR, the specification dictates that the STA reduce its transmit power based on the OBSS PD threshold chosen.

IEEE 802.11ax introduces new signaling to support SR operation in a STA. An AP may transmit inside its Beacon, Probe Response, or (Re)Association Response frame an SR Parameter Set (SRPS) element. Through the SRPS element, an AP can adjust and enable/disable many features of SR for STAs in their BSS.

SUMMARY

Embodiments of the present disclosure provide methods and apparatuses for enabling reuse, by an IEEE 802.11 node (or WI-FI node) in a BSS, of a channel medium that is in use by devices of a neighboring BSS (e.g., an OBSS) in a wireless network (e.g., a WLAN).

In one embodiment, a method of wireless communication performed by a first node is provided, including the steps of obtaining, based on transmissions from other nodes in at least one of a BSS or an OBSS, network context information for a network environment around the first node, updating an OBSS PD threshold for SR based on the network context information, and performing, for a transmission to one of the other nodes in the BSS, an SR CCA using the updated OBSS PD threshold for detection of packets transmitted by the nodes in the OBSS.

In another embodiment, a STA is provided, comprising a transceiver and a processor operably coupled to the transceiver. The transceiver is configured to obtain, based on transmissions from other nodes in at least one of a BSS or an OBSS, network context information for a network environment around the STA. The processor is configured to update an OBSS PD threshold for SR based on the network context information. The transceiver is further configured to perform, for a transmission to one of the other nodes in the BSS, an SR CCA using the updated OBSS PD threshold for detection of packets transmitted by the nodes in the OBSS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that the IEEE 802.11ax standard provides a new mode of operation, OBSS PD SR, which allows a STA (or AP) to transmit over inter-BSS PPDUs by reducing its transmission power to avoid adding interference to the inter-BSS PPDUs. This is done so that efficient re-utilization of spectrum is achieved while limiting inter-BSS interference. The standard does not dictate how this threshold is chosen and leaves this up to implementation.

Embodiments of the present disclosure further recognize that there are challenges when selecting the OBSS PD threshold for any given STA. For example, setting the OBSS PD threshold too low when close to the AP can lead to a lower throughput due to inefficient spectrum utilization. At the same time, setting the OBSS PD threshold too high when far from the AP can lead to lower throughput due to low modulation and coding scheme (MCS), high retransmission rate, or high packet failure, due to reduced signal-and-interference to noise ratio (SINR) from lowering the transmission power.

Accordingly, embodiments of the present disclosure provide methods and apparatuses for context-based PD threshold adaptation that considers the network environment around a device and the device's link and traffic status to allow the device to update its PD threshold for OBSS PD SR. Embodiments of the present disclosure also provide methods and apparatuses for enabling (or triggering) and disabling PD threshold adaptation.

For simplicity, embodiments of the present disclosure discuss OBSS PD SR as performed by a STA (i.e., a non-AP STA), however it is understood that an AP (i.e., an AP STA) can also perform OBSS PD SR. It is also understood that non-AP STAs and AP STAs are both IEEE 802.11 node devices (or nodes), which may also be referred to as WI-FI node devices (or nodes). Accordingly, discussion herein below of actions performed by a STA may be performed by any appropriate IEEE 802.11 node.

Figure 1:
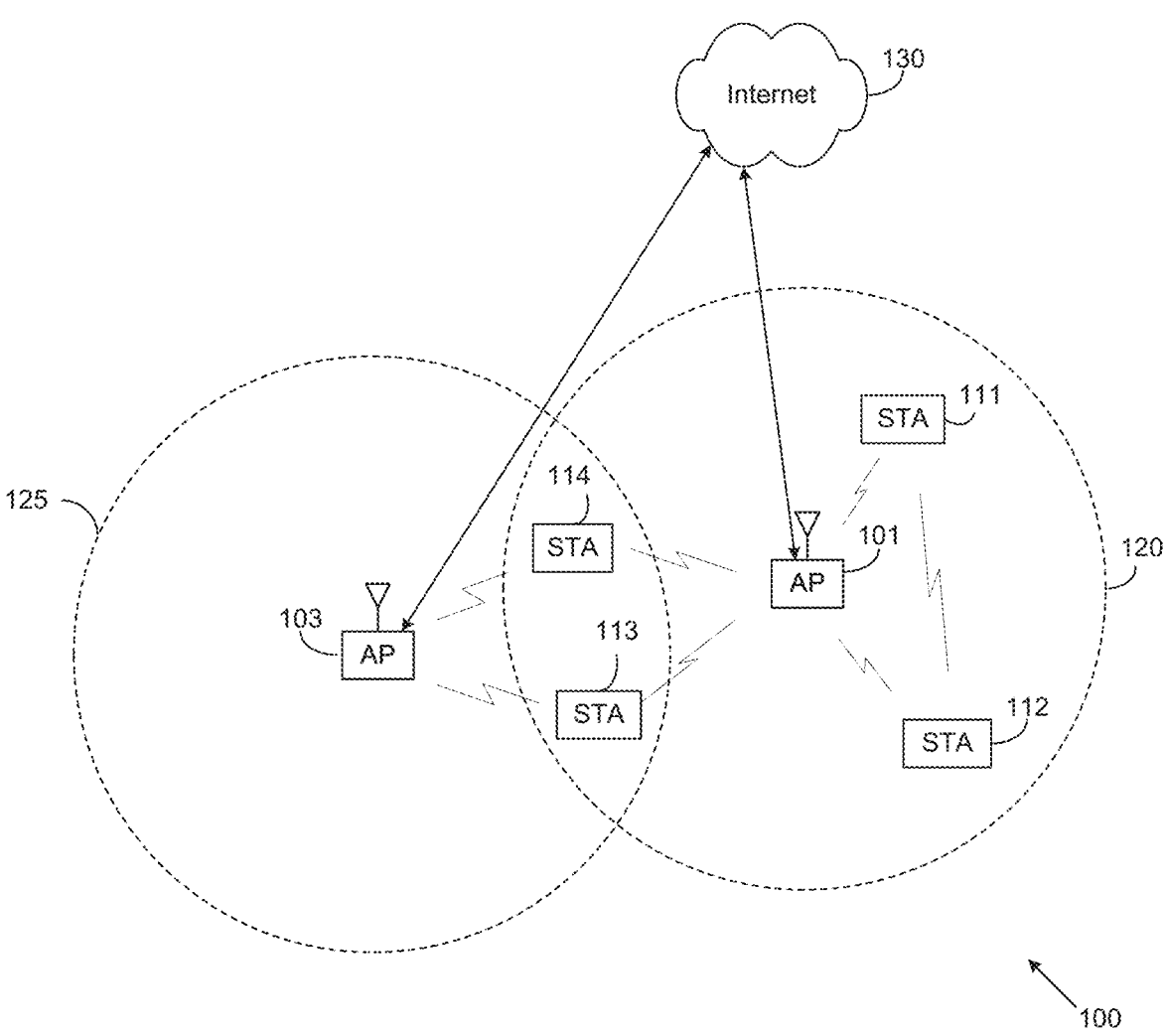
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating reuse of a channel medium that is in use by devices of a neighboring BSS (e.g., an OBSS) in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
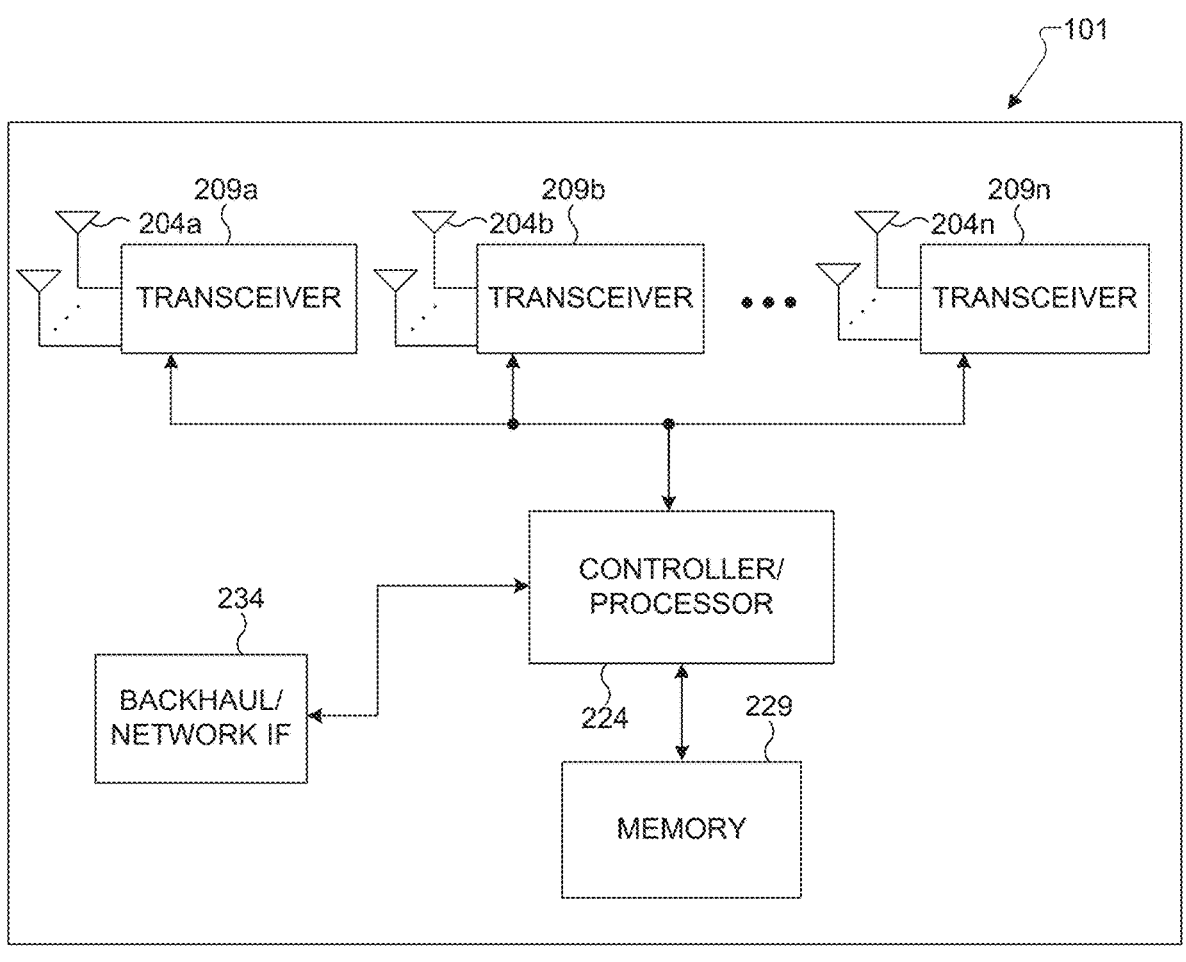
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n and multiple transceivers 209a-209n. The AP 101 also includes a controller/processor 224, a memory 229, and a backhaul or network interface 234. The transceivers 209a-209n receive, from the antennas 204a-204n, incoming radio frequency (RF) signals, such as signals transmitted by STAs 111-114 in the network 100. The transceivers 209a-209n down-convert the incoming RF signals to generate IF or baseband signals. The IF or baseband signals are processed by receive (RX) processing circuitry in the transceivers 209a-209n and/or controller/processor 224, which generates processed baseband signals by filtering, decoding, and/or digitizing the baseband or IF signals. The controller/processor 224 may further process the baseband signals.

Transmit (TX) processing circuitry in the transceivers 209a-209n and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209a-209n up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the transceivers 209a-209n in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating reuse of a channel medium that is in use by devices of a neighboring BSS (e.g., an OBSS). In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating reuse of a channel medium that is in use by devices of a neighboring BSS (e.g., an OBSS). Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
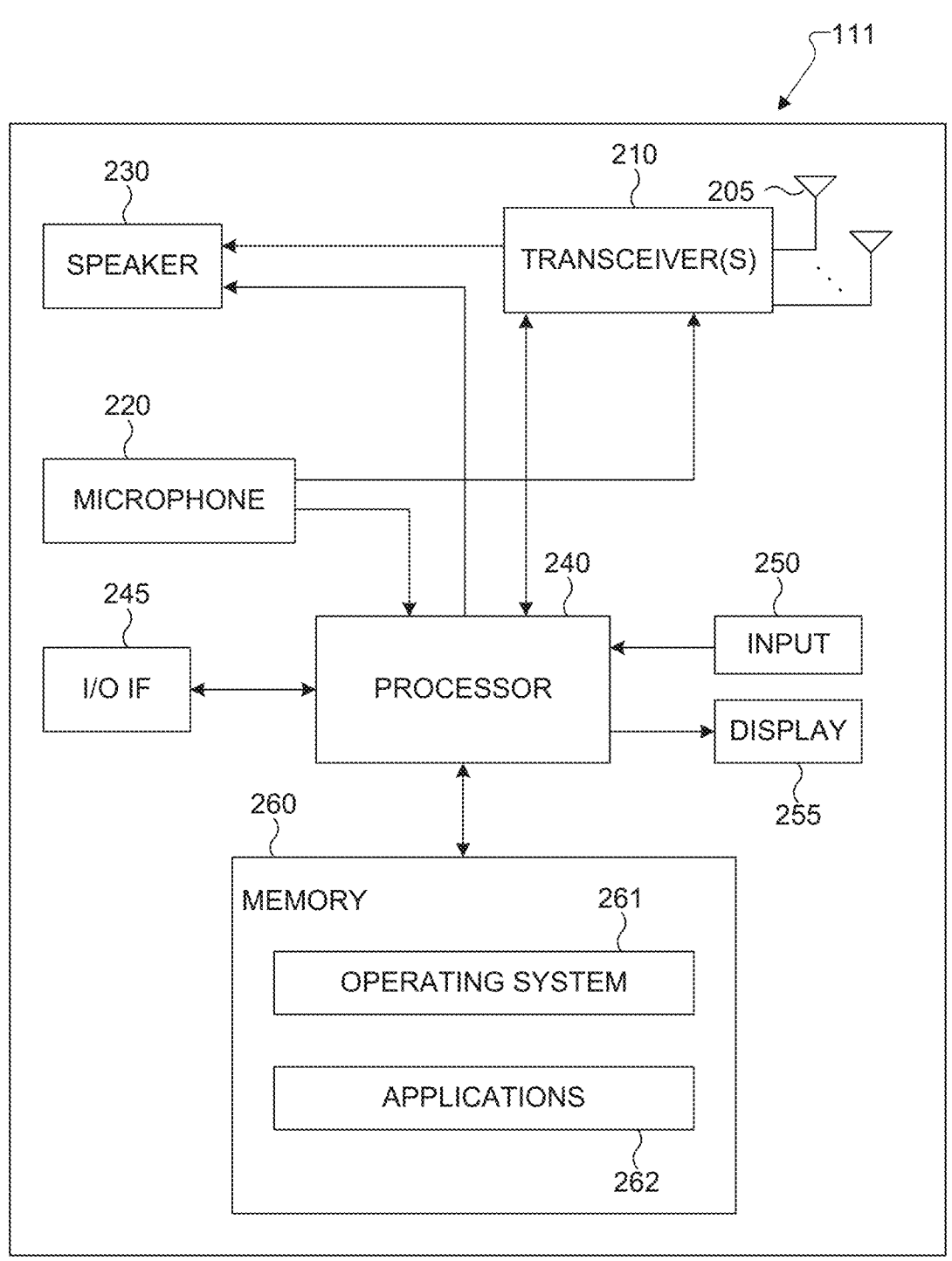
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives, from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to facilitate reuse of a channel medium that is in use by devices of a neighboring BSS (e.g., an OBSS). In some embodiments, the processor 240 includes at least one microprocessor or microcontroller.

The processor 240 is also capable of executing other processes and programs resident in the memory 260, such as operations for facilitating reuse of a channel medium that is in use by devices of a neighboring BSS (e.g., an OBSS). The processor 240 can move data into or out of the memory 260 as required by an executing process. In some embodiments, the processor 240 is configured to execute a plurality of applications 262, such as applications for facilitating reuse of a channel medium that is in use by devices of a neighboring BSS (e.g., an OBSS). The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As discussed above, if a STA performing CCA overhears a transmission from an OBSS (i.e., an inter-BSS transmission) that exceeds the PD threshold and ignores that inter-BSS transmission based on OBSS PD based SR, the STA must reduce its transmit power based on the OBSS PD threshold that was used.

Figure 3:
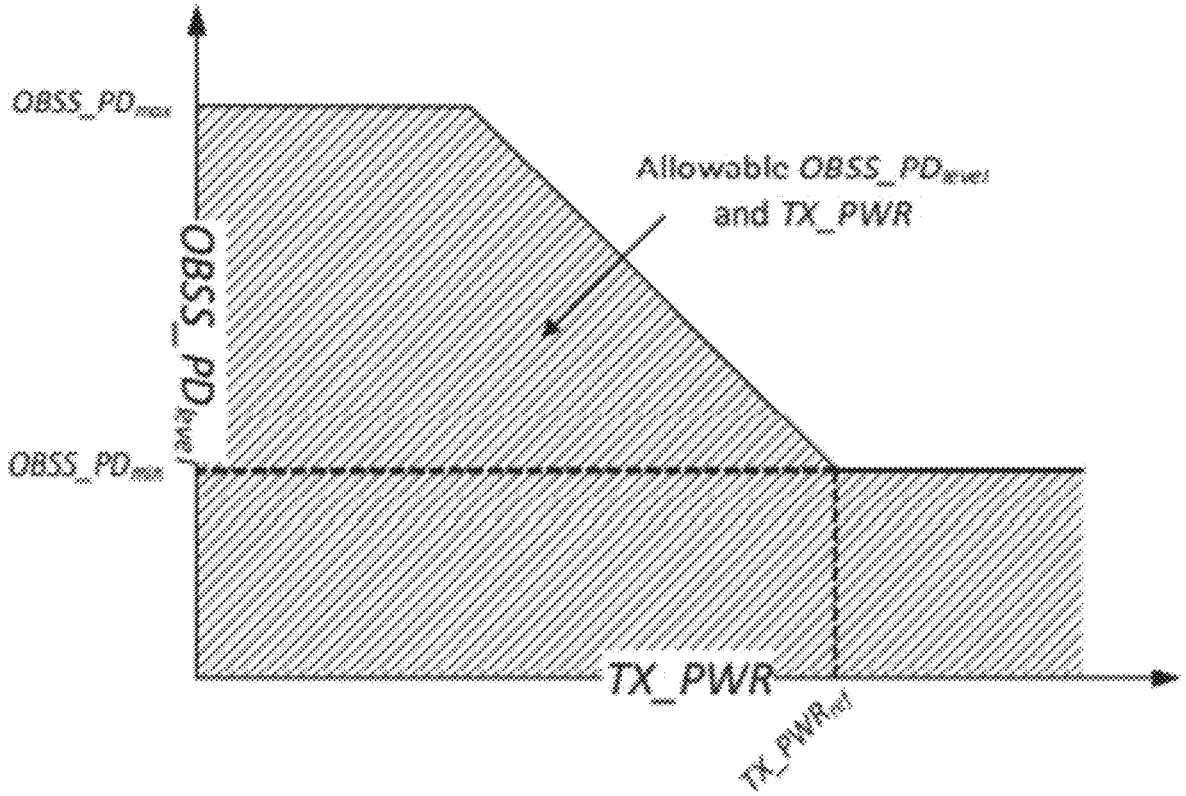
FIG. 3 illustrates an example graph of the relationship between transmit power and OBSS PD threshold according to various embodiments of the present disclosure.

FIG. 3 illustrates an example graph of the relationship between transmit power and OBSS PD threshold according to various embodiments of the present disclosure. The graph of FIG. 3 represents the following equation used to calculate the reduced transmit power, TX_PWR, based on the OBSS PD threshold, $OBSS\_PD_{level}$:

$$TX\_PWR =$$
$$TX\_PWR_{ref} - (OBSS\_PD_{level} - OBSS\_PD_{min}) + \log_{10}\left(\frac{PPDU\_BW}{20\ MHz}\right)$$

where $OBSS\_PD_{max} \geq OBSS\_PD_{level} > OBSS\_PD_{min}$, $OBSS\_PD_{max} = -62$ dBm, and $OBSS\_PD_{min} = -82$ dBm for a PPDU_BW of 20 MHz.

Figure 4:
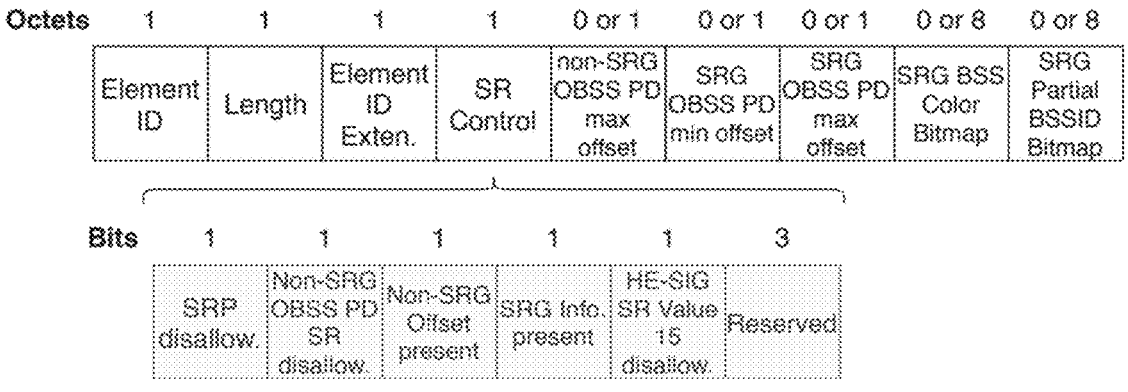
FIG. 4 illustrates an example format of an SRPS element according to various embodiments of the present disclosure.

FIG. 4 illustrates an example format of an SRPS element according to various embodiments of the present disclosure. The SRPS element is transmitted from an AP to an associated STA to control SR operation of the STA. Based on the parameters provided by the AP in the SRPS element, a STA may perform SR if allowed.

With reference to FIG. 4, Element ID is set to 255 and Length is not defined while Element ID extension is set to 39. Non-SRG OBSS_PD Max Offset is an integer used to generate the maximum Non-SRG OBSS_PD threshold. SRG BSS Color Bitmap indicates which BSS Color values are used by the members of the spatial reuse group (SRG). SRG Partial BSSID Bitmap indicates which partial BSSID values are used by members of the SRG.

The SR Control field contains the following parameters: PSR Disallowed indicates whether parametrized spatial reuse (PSR or SRP) transmissions are allowed by non-AP STAs associated with the AP that transmitted this element. Non-SRG OBSS PD SR Disallowed indicates whether non-spatial reuse group (non-SRG) OBSS PD based SR transmissions are allowed by non-AP STAs associated with the AP that transmitted this element. Non-SRG Offset Present indicates whether the Non-SRG OBSS_PD Max Offset subfield is present in the element. SRG Information Present indicates whether the SRG OBSS_PD Min Offset, SRG OBSS_PD Max Offset, SRG BSS Color Bitmap, and SRG Partial BSSID Bitmap subfields are present in the element. HE-SIG-A Spatial Reuse Value 15 Disallow indicates whether non-AP STAs associated with the AP that transmitted this element may set the TXVECTOR parameter SPATIAL REUSE to PSR AND NON-SRG-OBSS PD PROHIBITED. SRG OBSS_PD Max Offset is an integer used to generate the maximum SRG OBSS_PD threshold. SRG OBSS_PD Min Offset is an integer used to generate the minimum SRG OBSS_PD threshold.

SR support is indicated by a STA in the High-Efficiency (HE) Signal A (HE-SIG-A) field of each PPDU for both UL and DL PPDUs. A PPDU can also prohibit nodes in other BSSs from transmitting over it by setting the PSR AND NON-SRG-OBSS PD PROHIBITED bit if allowed by its associated AP.

Determining when to enable or disable OBSS PD SR, and the threshold that is used for channel access for SR, can be tuned as there is a range for this type of CCA threshold—the OBSS PD threshold can be set between minimum and maximum values (e.g., as indicated in the SRPS element above).

Figure 5:
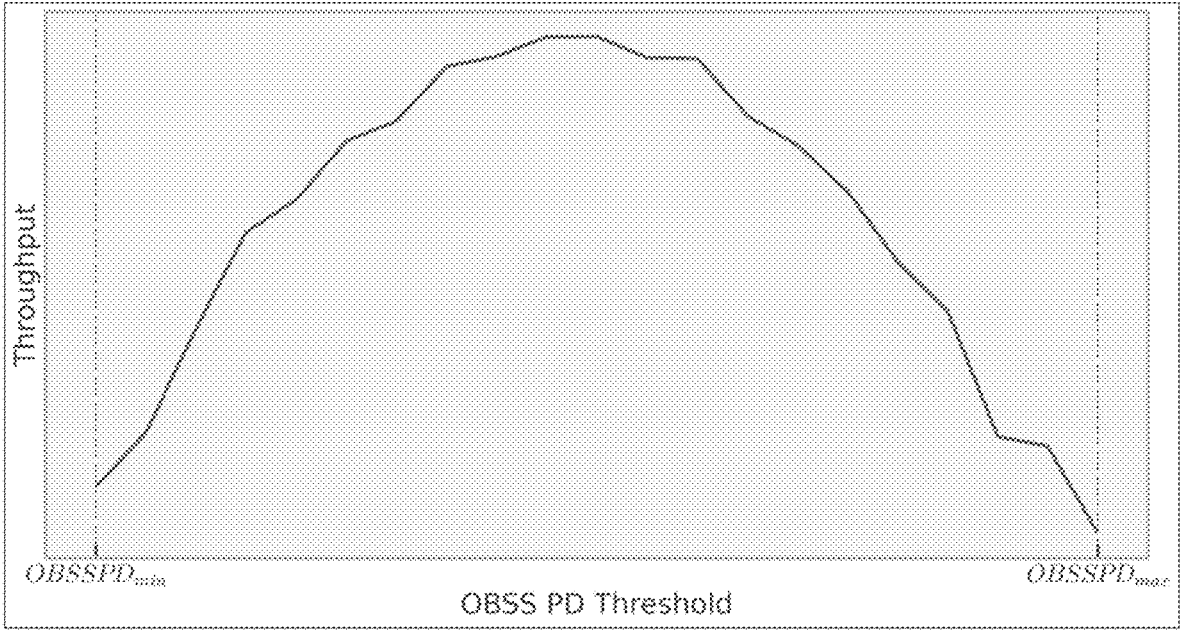
FIG. 5 illustrates an example of variation of throughput due to changing the OBSS PD threshold according to various embodiments of the present disclosure.

FIG. 5 illustrates an example of variation of throughput due to changing the OBSS PD threshold according to various embodiments of the present disclosure. This is just an example and does not represent the majority of cases. As discussed herein above, there are challenges when selecting the OBSS PD threshold for use with OBSS PD SR operation. There is a tradeoff between channel access opportunities and transmit power that is necessitated, and OBSS PD SR also introduces a tradeoff between enhancing channel access for the STA and creating interference to transmitted PPDUs in the OBSS. Similarly, optimization of the PD threshold is needed to avoid creating undue interference and unnecessarily lowering throughput.

A solution for optimizing the selected OBSS PD threshold is to consider a STA's link and traffic status along with other environment status (for example, the strength of the OBSS transmission, the distance from any interfering STA/AP and the STA of interest, and the number of overheard OBSSs). Considering all of these factors, a STA can optimize the selection of its OBSS PD threshold within the range allowed by the AP.

Accordingly, embodiments of the present disclosure describe a context based OBSS PD adaptation operating mode, in which the STA performing OBSS PD adaptation will choose an OBSS PD threshold based on the information about the environment it is operating in (i.e., the network context of the STA). An advantage provided by this method is that this information can be acquired even while the STA is not performing any data communication.

Furthermore, embodiments of the present disclosure describe mechanisms for triggering (enabling or disabling) OBSS PD adaptation. These trigger mechanisms initiate the OBSS PD adaptation when required and remain inactive when the OBSS PD operation provides no gain.

Figure 6:
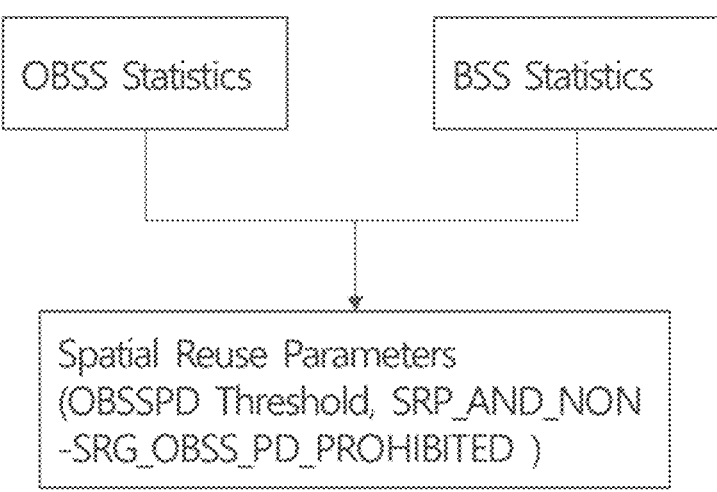
FIG. 6 illustrates an example of OBSS PD spatial reuse according to various embodiments of the present disclosure.

FIG. 6 illustrates an example of OBSS PD spatial reuse according to various embodiments of the present disclosure. In this embodiment, a STA or AP will measure the statistics from its own link and the statistics from the OBSS. Then, based on predefined value or metric the OBSS PD threshold is adjusted.

In one embodiment, the STA can create an OBSS-specific OBSS PD threshold (i.e., each OBSS has its own associated OBSS PD threshold value). One method to achieve this is through the "SRG/non-SRG OBSS PD enable" API command discussed in TABLE 2 below. In another embodiment, a unified OBSS PD threshold is created in consideration of the statistics of all OBSS PD thresholds. When selecting the OBSS PD threshold (whether an OBSS-specific threshold or a unified threshold), an optimization approach should be taken. One method to achieve this is through the "SRG/non-SRG OBSS PD enable based on OBSS" API command discussed in TABLE 2 below.

In one embodiment, the OBSS PD threshold is chosen to maximize the performance of the STA utilizing OBSS PD SR. In other words, the PD threshold is optimized to increase channel access for the STA regardless of other conditions. Other factors can be considered, such as traffic type or network service requirements that may affect the choice of OBSS PD threshold. Additionally, the average number of retransmissions may be considered as a factor to indicate how much SR support is needed. For example, a STA with a large number of expected retransmissions may need to utilize SR as much as possible (i.e., use an aggressive OBSS PD threshold) to be able to access the channel more often, while a STA with a low number of expected retransmissions may be able to set a lower OBSS PD threshold as it may not need as many channel access attempts.

In another embodiment, after selecting the optimal OBSS PD threshold for STA performance, further fairness tuning is done based on OBSS PPDUs. For example, if an OBSS PPDU has a low received signal strength indication (RSSI), this may indicate that the interfering OBSS device is far from the STA's BSS and hence a more aggressive OBSS PD threshold can be chosen (and vice versa). Another factor can be the frequency with which OBSS PPDUs include signaling prohibiting the use of SR over top of the OBSS PPDUs. For example, if the OBSS is frequently prohibiting SR transmissions parallel to its PPDUs, then a more aggressive OBSS PD threshold can be utilized to benefit from the small portion of time where SR is allowed (and vice versa).

In one embodiment, the average MCS of the STA performing SR and the average MCS of OBSS PPDUs is monitored to identify the tolerance to interference levels caused by parallel transmission in the BSS and OBSS due to SR. Deteriorating MCS levels may lead to more conservative OBSS PD threshold selection.

In another embodiment, a margin is applied to a BSS RSSI to choose the OBSS PD threshold. This margin can be a function of the BSS's and OBSSs' RSSI values. The margin may be applied on top of an initially selected OBSS PD threshold.

Figure 7:
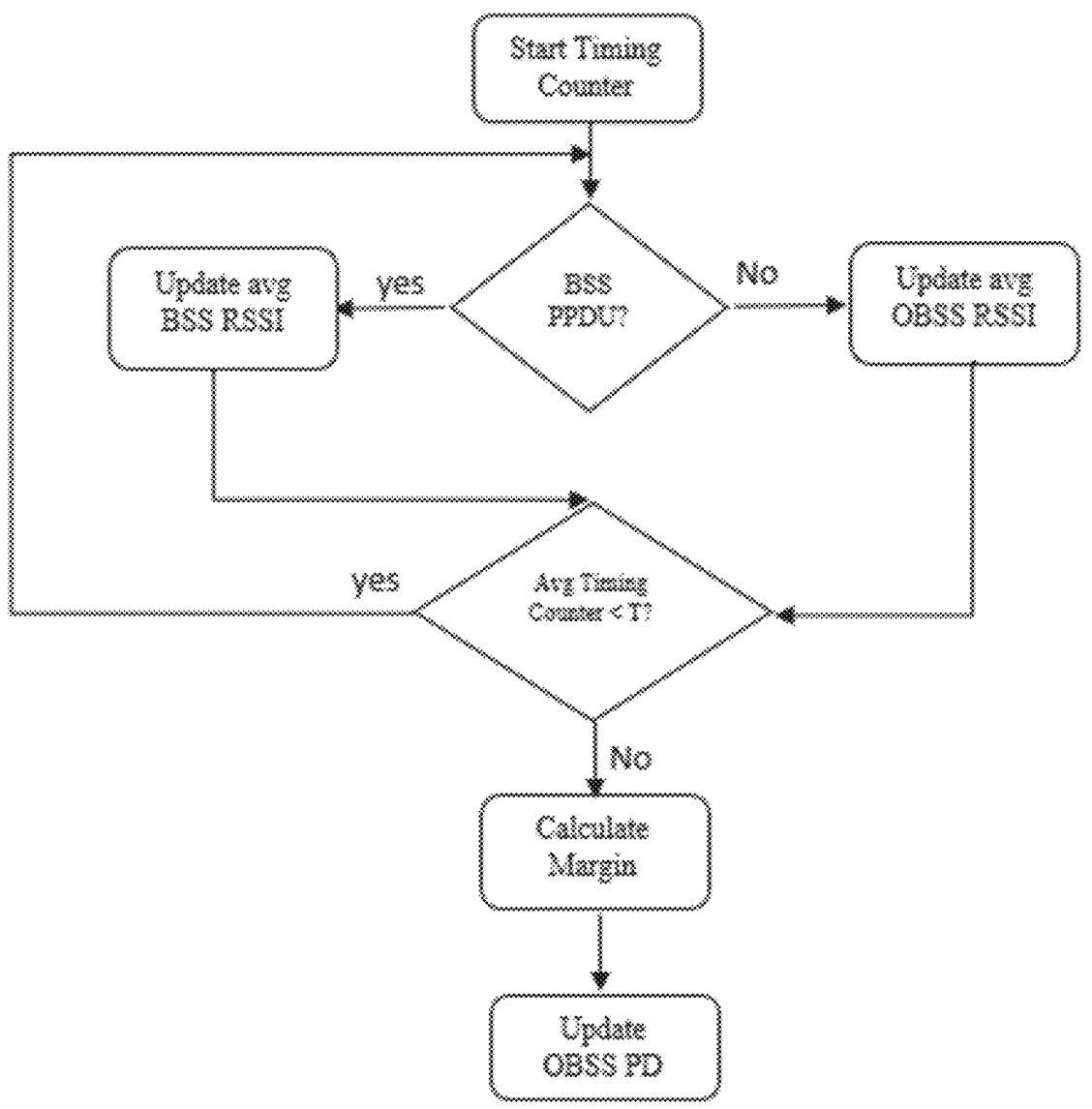
FIG. 7 illustrates an example operation for adjusting OBSS PD threshold utilizing BSS and OBSS RSSI information according to various embodiments of the present disclosure.

FIG. 7 illustrates an example operation for adjusting OBSS PD threshold utilizing BSS and OBSS RSSI information according to various embodiments of the present disclosure. In the example operation of FIG. 7, the BSS RSSI can be measured from the BSS AP or from all the nodes in the BSS. The OBSS RSSI can be measured by scanning the neighboring OBSS AP's management and control signals as well as data PPDUs from the OBSS nodes to build an OBSS RSSI mapping. This measurement is updated every T seconds. An exemplary value of T can be 500 ms. In another embodiment, the time period T can be a function of the BSS beacon interval or the number of beacons scanned. For example, the update can be performed after every 5 beacons instead of every 500 ms to ensure at least 5 BSS RSSI measurements are present. It is understood that 5 beacons is an exemplary value, and can be changed based on how fast the update is required or how many statistically significant measurements are required to make the best estimate.

In another embodiment, after selecting (or adjusting) an OBSS PD threshold, a network state estimate can be created from the point of view of the STA before and after using the selected PD threshold to enable further optimization of the OBSS PD threshold that is applied in the next update. Network state observations, or SR statistics, are collected by the STA to create the network state estimate. These include, but are not limited to, the number of transmission opportunities (TXOPs) created by the STA through SR (the higher the better), the number of PPDUs transmitted through SR (the higher the better), the number of PPDUs successfully transmitted through SR (the higher the better), UL throughput (the higher the better), and TX MCS distribution. As increasing the OBSS PD threshold reduces the TX power of the STA, the MCS distribution should remain relatively stable prior to adjusting the OBSS PD threshold and not deviate towards the lower MCS.

Figure 8:
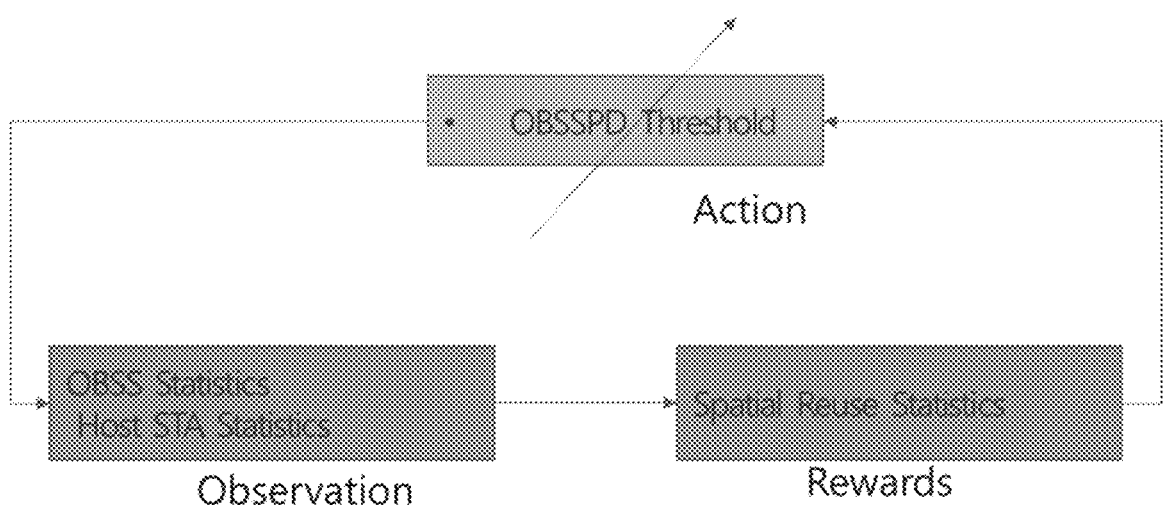
FIG. 8 illustrates an example feedback loop for updating an OBSS PD threshold according to various embodiments of the present disclosure.

FIG. 8 illustrates an example feedback loop for updating an OBSS PD threshold according to various embodiments of the present disclosure. Based on observed changes in one or more of the collected SR statistics after adjusting the OBSS PD threshold, a reward or penalty is created. As illustrated in FIG. 8, the reward or penalty is applied to the presently selected (or applied) OBSS PD threshold. Using this feedback mechanism, the OBSS PD threshold can be adjusted (or updated) until convergence is achieved or the STA moves to an idle state, leading to a stable OBSS PD threshold.

As OBSS PD SR allows an increased chance of obtaining TXOPs in dense environments, a trigger condition can be used by a STA to decide whether or not to use SR. In one embodiment, the trigger condition may create a network estimate using a combination of the following metrics observed or collected by the STA.

CCABusyTimeMs and RadioOnTimeMs counters obtained between two predetermined time intervals: a ratio of CCABusyTimeMs to RadioOnTimeMs can be used to determine if the channel is too busy to provide PPDUs to transmit over, i.e., to determine how much of the time that the STA attempted to transmit was taken up by the channel being detected as occupied. The number of PPDUs detected from the OBSS due to which the STA entered a state of CCA Busy and the total number of detected PPDUs due to which the STA entered a state of CCA Busy: a ratio of the number of OBSS PPDUs to the total number of PPDUs due to which the STA entered a state of CCA Busy can be used to estimate how many PPDUs are available to be transmitted over. The RSSI range of the OBSS PPDUs due to which the STA entered a state of CCA Busy: this can be used to determine an initial value of an OBSS PD threshold upon enabling SR. Traffic direction from the STA established on the device: maximum benefit can be achieved from SR when the traffic on the STA is uplink dominated or symmetric.

Based on a combination of 1 or more of the above criteria, the STA can trigger OBSS PD SR operation mode and set an OBSS PD threshold for one or more OBSS s.

In an alternative embodiment, given a latency- or QoS-sensitive service output from the Network Service Detection (NSD), or when an important Access Category is being used, a PPDU from the STA could be protected from interference by setting the SPATIAL_REUSE field in the HE-SIG-A to PSR_AND_NON_SRG_OBSS_PD_PROHIBITED. This would prevent OBSS PPDUs from performing SR over the STA's PPDU.

Figure 9:
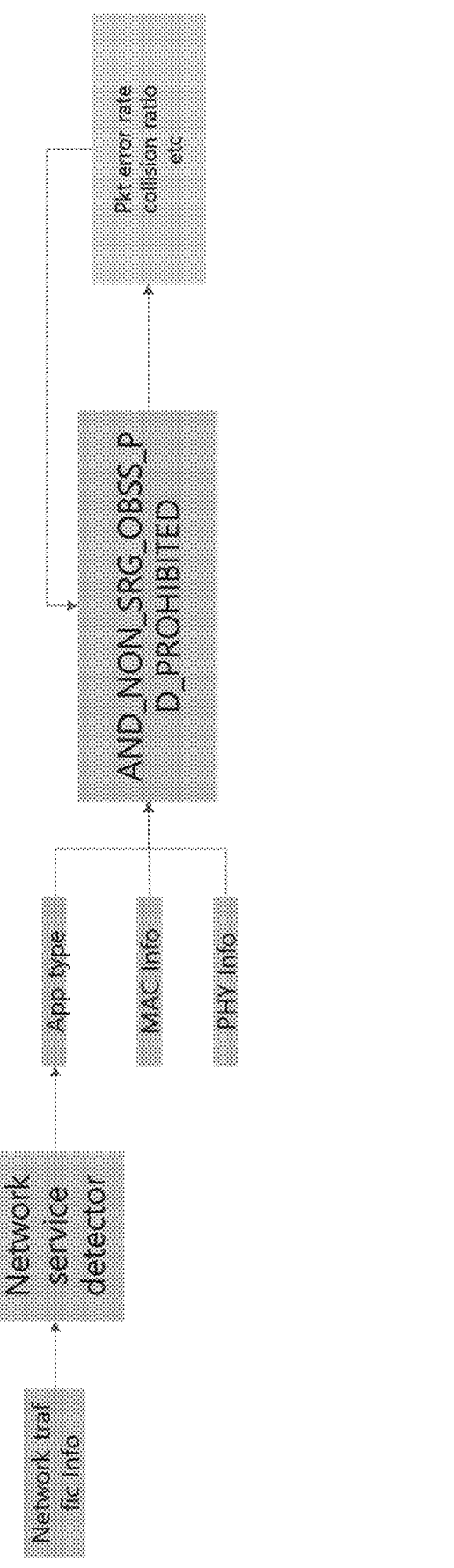
FIG. 9 illustrates an example of network service assisted SR disabling according to various embodiments of the present disclosure.

FIG. 9 illustrates an example of network service assisted SR disabling according to various embodiments of the present disclosure. A congestion level threshold can be used to classify the ratio of CCABusyTimeMs and RadioOn- TimeMs measured between two time intervals into a binary state—congested or not—but it does not necessarily need to be restricted to just two states. Upon establishing a Network Congestion measurement, the STA will perform a comparison between the current MCS or MCS distribution measurement and a historical or expected estimate of the MCS or MCS distribution given a combination of one or more of Network Congestion, RSSI, Transmit Success Ratio and OBSS density. Upon establishing a deviation metric of the MCS or MCS distribution between the measurement and the estimate, the SPATIAL_REUSE field in the HE-SIG-A can be set to PSR_AND_NON_SRG_OBSS_PD_PROHIB-ITED to improve the MCS or MCS distribution based on the deviation metric. After enabling PSR_AND_NON_SR-G_OBSS_PD_PROHIBITED, the improvement can be evaluated by monitoring the deviation metric to see if it improves, and observing the Transmit Success Ratio as well if needed.

Figure 10:
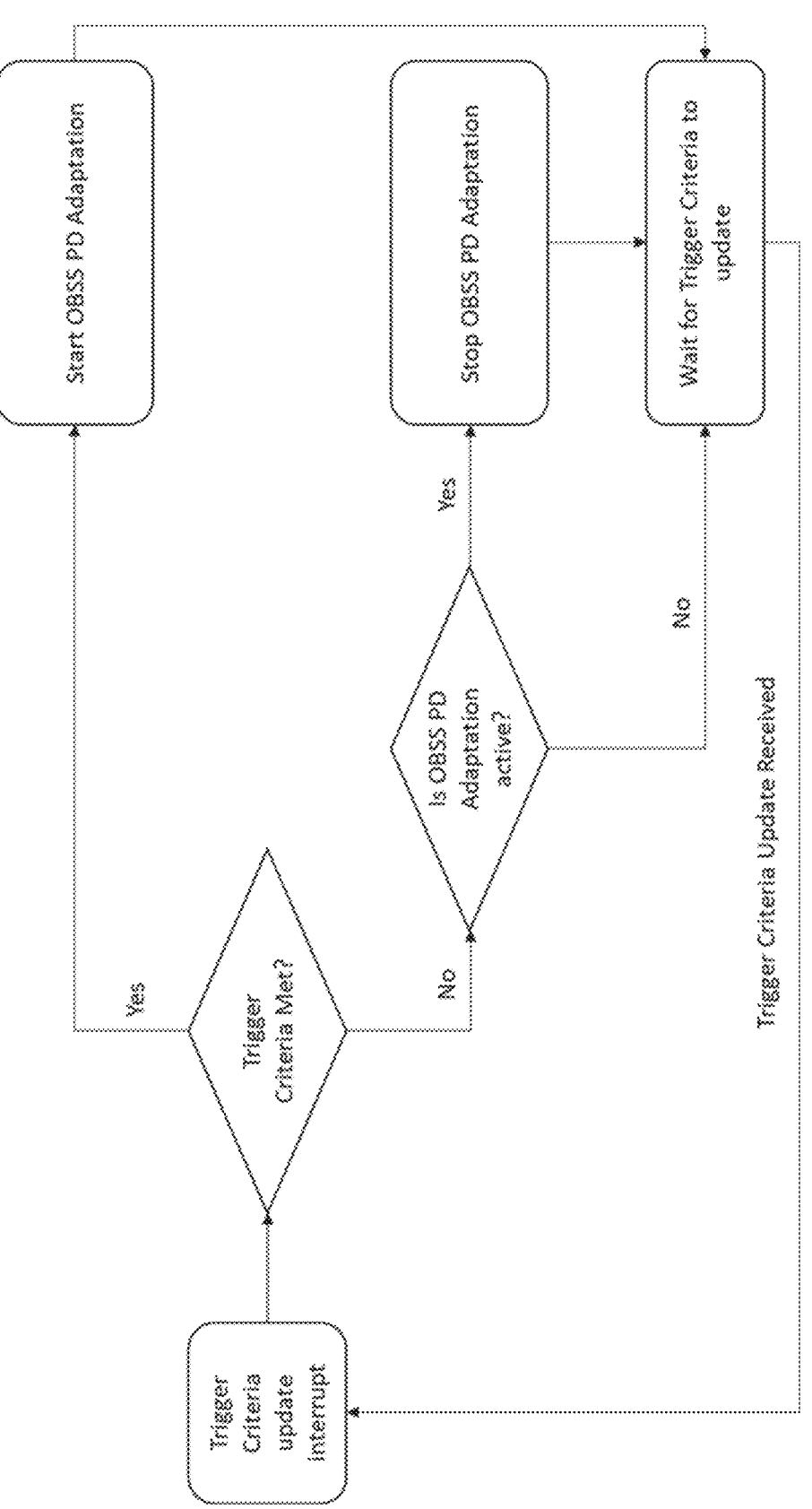
FIG. 10 illustrates an example process for triggering and terminating OBSS PD threshold adaptation according to various embodiments of the present disclosure.

FIG. 10 illustrates an example process for triggering and terminating OBSS PD threshold adaptation according to various embodiments of the present disclosure. In this embodiment, a trigger condition is initially defined as a means of activating OBSS PD adaptation subject to certain criteria. These criteria are observable and measurable by the STA performing the OBSS PD adaptation. The trigger condition can be set as one or a combination of the criteria. An interrupt can be assigned to measuring these criteria and the OBSS PD adaptation algorithm can be initiated or terminated based on the trigger criteria being fulfilled or not. In some embodiments, enabling or disabling (or initiating and terminating) OBSS PD threshold adaptation may be synonymous with enabling or disabling OBSS PD SR altogether (that is, any time the STA is using OBSS PD SR, it is also performing OBSS PD threshold adaptation to update the PD threshold). The criteria for triggering the OBSS PD adaptation algorithm include:

The STA is serving traffic for a latency-sensitive application, e.g., a Video Call or Mobile Gaming. This information can either be provided by the application, inferred from observing the foreground or most active application on the STA, inferred from certain peripherals being active on the device used by the application, or through the means of a network service detector classifying traffic on the STA. This information can be gathered from the operating system of the STA based on observing the application ID, foreground application trigger, active application triggers, and application process statistics. OBSS PD adaptation is enabled if a latency-sensitive application is performing data communication.

The throughput generated by an application is greater than the throughput currently served by the STA, which can lead to saturation. Such saturation can be eased by creating more TXOPs (e.g., by using a more aggressive OBSS PD threshold).

The traffic identifier on the MAC Header of traffic generated by an application is marked with a User Priority higher than 3, i.e., the traffic is labelled as belonging to the Voice or Video access category as specified by the 802.11e amendment.

The IETF differentiated services class in the IP header of traffic generated by an application is labeled Expedited Forwarding, Assured Forwarding, or Voice Admit, or the Class Selector of the traffic is labeled above CS3.

The channel utilization of the BSS AP and OBSS AP are above a certain threshold. The channel utilization can be extracted from the BSS Load element of the beacon of the OBSS or BSS AP. As an exemplary value, OBSS PD adaptation operation can be initiated when the channel utilization is above 33% for the AP (at which point the channel may be considered congested).

The ratio of the time the receiver was in the CCA_BUSY state (i.e., sensing the channel as busy) to the time the radio was on is above a certain threshold. As an exemplary value, the OBSS PD adaptation operation can be initiated when the ratio of time the receiver was in CCA_BUSY to the radio being on is above 0.33 (i.e., the receiver detected the channel as occupied 33% of the time that the radio was on).

Figure 11:
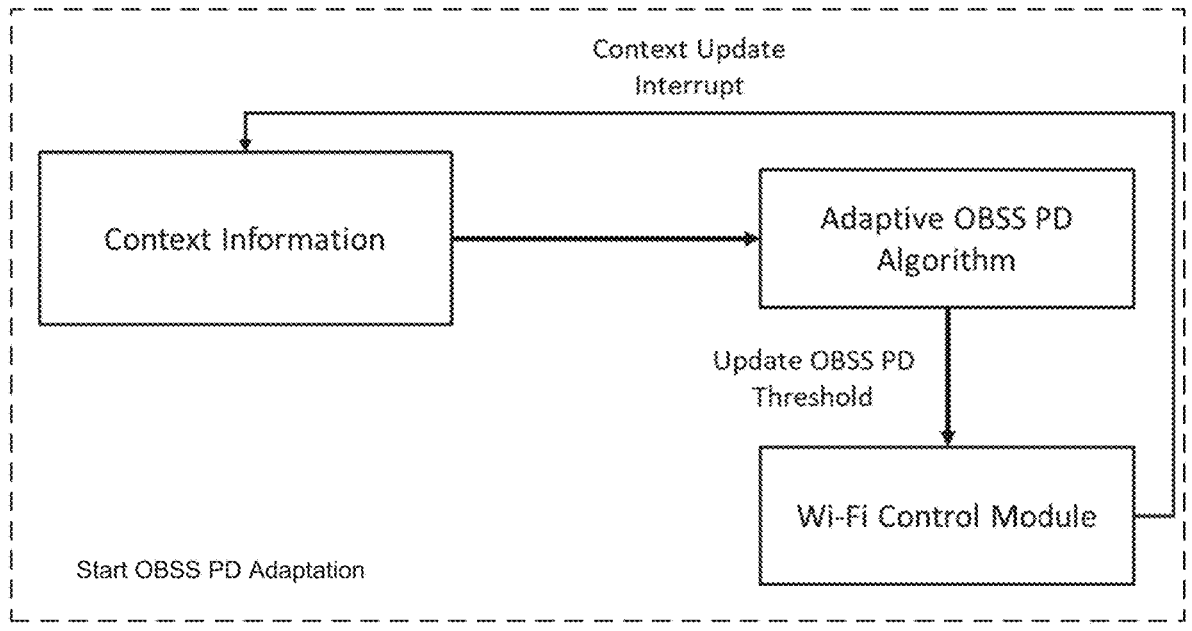
FIG. 11 illustrates an example process for OBSS PD threshold adaptation according to various embodiments of the present disclosure.

FIG. 11 illustrates an example process for OBSS PD threshold adaptation according to various embodiments of the present disclosure. The example process of FIG. 11 may be performed in the process of FIG. 10 after OBSS PD threshold adaptation is triggered (or initiated). That is, the example process of FIG. 11 may begin when the "Start OBSS PD Adaptation" block of FIG. 10, and may continue until the "Stop OBSS PD Adaptation" block is reached.

Upon receiving the trigger to initiate OBSS PD adaptation, the STA can either begin measuring the network context related information or use existing context related information that is measured periodically to quickly start the adaptation. The network context can be defined as one or more of the following measurements/observations:

The RSSI of the AP to which the STA is associated. This is periodically recorded from the beacon that the AP broadcasts. The higher the BSS AP RSSI, the higher the OBSS PD threshold can be set. For example, the value of the OBSS PD threshold can be set in the following way: if the sensed RSSI from the AP is X dB, then the OBSS PD threshold can be set as X-S-$\Delta$ dB, where S is the worst-case scenario SINR and $\Delta$ is the power difference between the AP and STA.

The RSSIs of surrounding OBSS APs. This is periodically passively scanned from any beacons received by the STA from OBSS APs, or it can be actively solicited by sending out a probe request. The higher the OBSS RSSIs, the higher the OBSS PD threshold needs to be set to transmit over OBSS PPDUs. For example, the value of the OBSS PD threshold can be set in the following way: if all of the OBSS RSSI transmissions are above Y dB, and Y$\in$(−82, −62], then setting an OBSS PD threshold below Y dB will provide no gain. Therefore, the OBSS PD threshold value should be set above Y dB.

The weighted or unweighted average (or mean) of OBSS RSSI transmissions. For any preamble that is decoded by the STA of any transmission in the OBSS channel, the RSSI is categorized based on belonging to that respective OBSS. In an unweighted average, the average is calculated over all OBSS RSSIs that are encountered. In a weighted average, the average is calculated per OBSS, then a global average is calculated by providing individual weights to each respective OBSS subject to the number of PPDUs it has transmitted. This can simply be the number of PPDUs transmitted from a particular OBSS divided by all OBSS PPDUs. This can allow setting the OBSS PD threshold based on the number of OBSS PPDUs that can be transmitted over rather than the overall OBSS RSSI. To calculate the average OBSS RSSI, the STA can set a time window for averaging to a fixed time interval or N Target Beacon Transmission Times (TBTTs). As an example, the average can be calculated every 500 ms in one embodiment, and in 5 TBTTs in another. The OBSS PD threshold can be set to the calculated average value.

The Channel Utilization of the BSS AP. This field can be found in the BSS Beacon in the BSS Load element. If the Channel Utilization of the BSS AP is low, then the OBSS PD threshold can be lowered or the OBSS PD SR operation can be disabled. If there are not many transmissions in the medium to transmit over, then enabling OBSS PD provides minimal gain so it can be disabled. As an example, if the channel utilization is below 25%, then OBSS PD SR can be disabled.

The Channel Utilization of the OBSS APs. This field can be found in the OBSS Beacon in the BSS Load element. If the Channel Utilization of the OBSS APs is low, then the OBSS PD threshold can be lowered or the OBSS PD SR operation can be disabled. Similar to the above metric, if the channel utilization by all OBSS APs is low, then the gain provided by OBSS PD is minimal. If the OBSS APs also sense that the channel is under occupied, then OBSS PD SR can be disabled. As an example, if the OBSS AP channel utilization is below 25%, then OBSS PD SR can be disabled.

The OBSS PD threshold applied at the BSS AP and other BSS STAs. The BSS can broadcast a suggested OBSS PD threshold to all of the associated STAs and also provide feedback in terms of what is currently utilized by the AP. This can be used as an initial OBSS PD threshold value to be adjusted based on separate context information. This value is obtained from the Spatial Reuse Parameter Set element in the OBSS PD Margin field and is subtracted from the Beacon RSSI to set the OBSS PD value.

The distance to the BSS AP. This can be found by using WI-FI fine time measurements round-trip time (RTT), WI-FI CSI-based localization, or other wireless localization technologies employed by the AP (e.g., BLUETOOTH, ultra-wideband, etc.). The farther away the BSS AP is from the STA, the lower the OBSS PD threshold will need to be set. As the STA moves further away from the AP, the received power of transmissions from the STA to the AP will also decrease and this can decrease the SINR, causing low transmit speeds and packet failures. The STA can then create a mapping from distance to power using the path loss model. The path loss value can then be used as a reference to set the OBSS PD threshold to maintain required SINR similar to the way that the RSSI of the BSS AP can be used.

The distance to the OBSS AP. This can be requested from the OBSS AP in a similar manner as it can be requested from the BSS AP. The farther away the OBSS AP is from the STA, the lower the OBSS PD threshold can be set. Similar to the above, using a path loss model, the received signal from the OBSS APs participating in RTT can be mapped using the obtained distance. Then the path loss value can be used as a reference to calculate the OBSS PD threshold similar to the way that the RSSIs of OBSS APs can be used.

The number of PPDUs with the PSR_AND_NON_SR-G_OBSS_PD_PROHIBITED bit set. This can be taken as an absolute value or as a relative value in comparison to the total number of PPDUs observed (i.e., a ratio of the two numbers). If the absolute value or ratio is high, the chances of successfully performing SR may decrease and the operation can be disabled.

In one embodiment, the OBSS PD threshold is set as:

$$OBSS\_PD = \begin{cases} OBSS_{RSSI} + 1, & OBSS_{RSSI} < BSS_{RSSI} \\ OBSS\_PD_{MIN}, & \text{else} \end{cases}$$

where $OBSS_{RSSI}$ can represent any one of, or a combination of: the average of the OBSS RSSI received from all OBSS APs, the unweighted average of all OBSS transmissions overheard by the STA, the weighted average of all OBSS transmissions overheard by the STA, the OBSS RSSI of the AP that has a high channel utilization (or the highest channel utilization), the OBSS RSSI of the AP closest to the STA, and the OBSS RSSI of the APs that have the least number of PPDUs with the PSR_AND_NON_SRG_OBSS_PD_PROHIB-ITED bit set. The STA can create an interrupt based on any changes to these measurements and if any one of them changes, the context-based PD threshold adaptation can repeat again and adapt the OBSS PD threshold.

A list of parameters that are used to tune the OBSS PD threshold and parameters that are controlled to adjust SR functionality (e.g., via the SRPS element) is provided in TABLE 1. This table contains two types of parameters: Input parameters that are used to adjust OBSS PD threshold, and output parameters that are controlled by the algorithm and set the functionality of SR operation at the STA/AP.

TABLE 1

| Type | Functionality | Parameters |
|------|---------------|------------|
| Input Parameters | SR statistics collected for each of the OBSSs that are observed at the STA side (or AP side if AP is using spatial reuse) | Number of spatial reuse tx ppdu |
| | | Number of spatial reuse tx opportunities |
| | | Number of non srg tx opportunities |
| | | Number of non srg ppdu tried |
| | | Number of non srg ppdu success |
| | | Number of srg tx opportunities |
| | | Number of srg ppdu tried |
| | | Number of srg ppdu success |
| | Environment sensing parameters that allows enabling/disabling SR along with adjusting SR Thresholds | MAC id of m-th OBSS STA or AP |
| | | Max, average, and median RSSI of m-th OBSS STA or AP |
| | | Average MCS of m-th OBSS STA or AP |
| | | STA or AP indicator of m-th OBSS STA or AP |
| | | Number of PPDUs from m-th OBSS STA or AP |
| | | OBSS SRP_AND_NON-SRG_OBSS_PD_PROHIBITED count from m-th OBSS STA or AP |
| | Estimating robustness for MPDU transmission | Expected Transmission count |
| | Estimating PHY link quality | CCA_BusyTime caused by each OBSS |
| | | RadioOnTime for each of OBSSs |
| | Enforced parameters by associated AP for STA's SR operation with adding restrictions including a range for OBSS PD Threshold | SRG OBSS PD Min Offset |
| | | SRG OBSS PD Max Offset |
| | | Non-SRG OBSS PD Max Offset |
| | | HE-SIG-A SR Value 15 Disallow |
| | | Non-SRG OBSS PD SR Disallowed |

TABLE 1-continued

| Type | Functionality | Parameters |
|------|--------------|------------|
| Output Parameters | STA's decision to enable/disable SR along with thresholds and extra protection | SRP_AND_NON-SRG_OBSS_PD_PROHIBITED OBSS PD Thresholds for SRG and non-SRG (OBSS specific) SRG/non-SRG OBSS PD Enable/Disable |

A set of Application Programming Interface (API) commands is provided in TABLE 2.

TABLE 2

| Operation | Command format |
|-----------|----------------|
| SRG/non-SRG OBSSPD enable | This command will be delivered when the host wants to setup the OBSS-PD threshold for spatial reuse in dBm format The range will lie between −82 to −62 in increments of 1 OBSSPD_ENABLE <options> @param Enable: 1 or Disable: 0 If enabled, followed by a value between −82 to −62 dBm @return status 0: Success Negative value: Failure Positive value: Success and Others Usage examples: Enable OBSS-PD threshold for spatial reuse with value of −75 dBm DRIVER OBSSPD_ENABLE 1 −75 |
| SRG/non-SRG OBSSPD enable based on OBSS Note: it is up to vendors how to distinguish OBSS either by color or some other mechanism. | This command will be delivered when the host wants to setup the OBSS-PD threshold for spatial reuse in dBm format The range will lie between −82 to −62 in increments of 1 OBSSPD_ENABLE <options> @param Enable: 1 or Disable: 0 If enabled, provide a OBSS for which the OBSSPD threshold will be set followed by a value between −82 to −62 dBm This can also be done for multiple OBSS in the same way @return status 0: Success Negative value: Failure Positive value: Success and Others Usage examples: Enable OBSS-PD threshold for spatial reuse with value of −75 dBm for OBSS1 and −80 dBm for OBSS2 DRIVER OBSSPD_ENABLE 1 XX:XX:XX:XX:XX:01 −75 XX:XX:XX:XX:XX:02 −80 |
| SRP_AND_NON-SRG_OBSS_PD_PROHIBITED enable | This command will be delivered when the host wants to operate in SRP_AND_NON-SRG_OBSS_PD_PROHIBITED mode. This will prevent other hosts from performing SR over self PPDUs SRP_AND_NON-SRG_OBSS_PD_PROHIBITED <enable|disable> @param Enable: 1 or Disable: 0 @return status 0: success Negative value: Failure Positive value: Success and others Usage examples: Enable SRP_AND_NON-SRG_OBSS_PD_PROHIBITED for current host DRIVER SRP_AND_NON-SRG_OBSS_PD_PROHIBITED 1 |
| Spatial Reuse Statistics Query | This command will be delivered when the host wants to get the statistics of traffic exchange related to Spatial Reuse GET_SR_STATISTICS @param None @return statistics Following information should be returned as text form separated by single space Number of spatial reuse tx ppdu Number of spatial reuse tx opportunities Number of non srg tx opportunities Number of non srg ppdu tried Number of non srg ppdu success Number of srg tx opportunities Number of srg ppdu tried Number of srg ppdu success |

TABLE 2-continued

| Operation | Command format |
|---|---|
| | These are counters updated from the start of the device<br>Return value examples:<br>DRIVER GET__SR__STATISTICS<br>50 10 8 32 30 2 21 20<br>(This means 50 SR PPDUs, 10 Tx Opportunities, 8 Non SRG Tx<br>Opportunities, 32 Non SRG PPDUs tried, 30 Non SRG PPDUs<br>success, 2 SRG TX Opportunities, 21 SRG tried PPDUs, 20 SRG<br>Success PPDUs) |
| Clear Spatial Reuse<br>Statistics | This command will be used to clear the Spatial Reuse STA or AP<br>statistics Query data<br>CLEAR__SR__STATISTICS<br>@param None<br>@return None |
| Spatial Reuse<br>Statistics Query per<br>OBSS<br>Note: it is up to<br>vendors how to<br>distinguish OBSS<br>either by color or<br>some other<br>mechanism. | This command will be delivered when the host wants to get the<br>statistics of traffic exchange related to Spatial Reuse per OBSS<br>GET__SR__PER__OBSS__STATISTICS<br>@param None<br>@return statistics<br>Following information should be returned as text form containing<br>number of OBSS and MAC ID of each OBSS separated by single<br>space for the following statistics for each OBSS<br>Number of spatial reuse tx ppdu<br>Number of spatial reuse tx opportunities<br>Number of non srg tx opportunities<br>Number of non srg ppdu tried<br>Number of non srg ppdu success<br>Number of srg tx opportunities<br>Number of srg ppdu tried<br>Number of srg ppdu success<br>These are counters updated from the start of the device or last clear<br>Return value examples:<br>DRIVER GET__SR__PER__OBSS__STATISTICS<br>2 XX:XX:XX:XX:XX:01 50 10 8 32 30 2 21 20<br>XX:XX:XX:XX:XX:02 40 8 6 22 20 2 21 20 |
| Clear Spatial Reuse<br>Statistics Query per<br>OBSS | This command will be used to clear the OBSSPD statistics per<br>OBSS Query data<br>CLEAR__SR__PER__OBSS__STATISTICS<br>@param None<br>@return None |
| OBSS STA or AP<br>Statistics Query<br>Note: it is up to<br>vendors how to<br>distinguish OBSS<br>either by color or<br>some other<br>mechanism. | This command will be delivered when the host needs to request the<br>top N OBSS STA or AP according to RSSI and the number of<br>PPDUs experienced from them<br>GET__OBSS__STATISTICS N<br>@param N: Number of top N OBSS AP or STA based on RSSI<br>from the OBSS AP or STA<br>@return statistics<br>Following information should be returned as a text form separated<br>with a single space:<br>M: number of received OBSS STAs or Aps<br>For m in M<br>MAC id of m-th OBSS STA or AP<br>Max RSSI of m-th OBSS STA or AP<br>Average RSSI of m-th OBSS STA or AP<br>Median RSSI of m-th OBSS STA or AP<br>Average MCS of m-th OBSS STA or AP<br>STA or AP indicator of m-th OBSS STA or AP (0 for STA, 1 for<br>AP)<br>Number of PPDUs from m-th OBSS STA or AP<br>OBSS SRP__AND__NON-SRG__OBSS__PD__PROHIBITED count<br>from m-th OBSS STA or AP<br>End<br>DRIVER GET__OBSS__STATISTICS 5<br>5 XX:XX:XX:XX:XX:01 −55 −60 −60 5 0 6 300 200<br>XX:XX:XX:XX:XX:02 −62 −65 −65 6 1 10 400 300<br>XX:XX:XX:XX:XX:03 −66 −70 −70 3 1 14 200 100<br>XX:XX:XX:XX:XX:04 −72 −74 −74 2 0 7 700 600<br>XX:XX:XX:XX:XX:05 −74 −78 −78 3 1 6 300 200 |
| Number of OBSS<br>seen by Host | This command will be delivered when the host needs to establish a<br>count of the different OBSS STA/AP experienced by counting the<br>color of PPDU or other methods to distinguish OBSS<br>GET__OBSS__COUNT<br>@param None<br>@return Count of all the OBSS STA and AP<br>Return value examples<br>DRIVER GET__OBSS__COUNT<br>10<br>(This means that 10 different OBSS STA/AP) |

TABLE 2-continued

| Operation | Command format |
|---|---|
| Clear OBSS seen by host count | This command will be used to clear the OBSS seen by Host count Query data<br>CLEAR_OBSS_COUNT_STATISTICS<br>@param None<br>@return None |
| Get SR_Parameter_Set | This command will be used to get the spatial reuse parameter set from associated AP<br>@param None<br>@return most recent spatial reuse parameter set element from associated AP<br>Following information should be returned as a text form separated with a single space:<br>SRG OBSS PD Min Offset: integer to generate the minimum SRG OBSS_PD threshold offset<br>SRG OBSS PD Max Offset: integer to generate the maximum SRG OBSS_PD threshold offset<br>Non-SRG OBSS PD Max Offset: integer to generate the maximum Non-SRG OBSS_PD threshold offset<br>HE-SIG-A SR Value 15 Disallow: indicates whether non-AP STAs associated with the AP that transmitted this element may set the TXVECTOR parameter SPATIAL REUSE to PSR AND NON-SRG-OBSS-PD PROHIBITED.<br>Non-SRG OBSS PD SR Disallowed: indicates whether non-SRG OBSS_PD SR transmissions are allowed or not at non-AP STAs associated with the AP that transmitted this element<br>End<br>Return value example:<br>Get_SR_Parameter_Set<br>2 2 4 0 0 |
| Other APIs | RSSI of the associated BSS can already be obtained from the Link Layer Stats<br>PHY Link Quality Metrics:<br>Average Link TX Phy Rate<br>Tx Success Rate per AC<br>Tx MCS Distribution<br>CCABusyTimeMs and RadioOnTimeMs |

Figure 12:
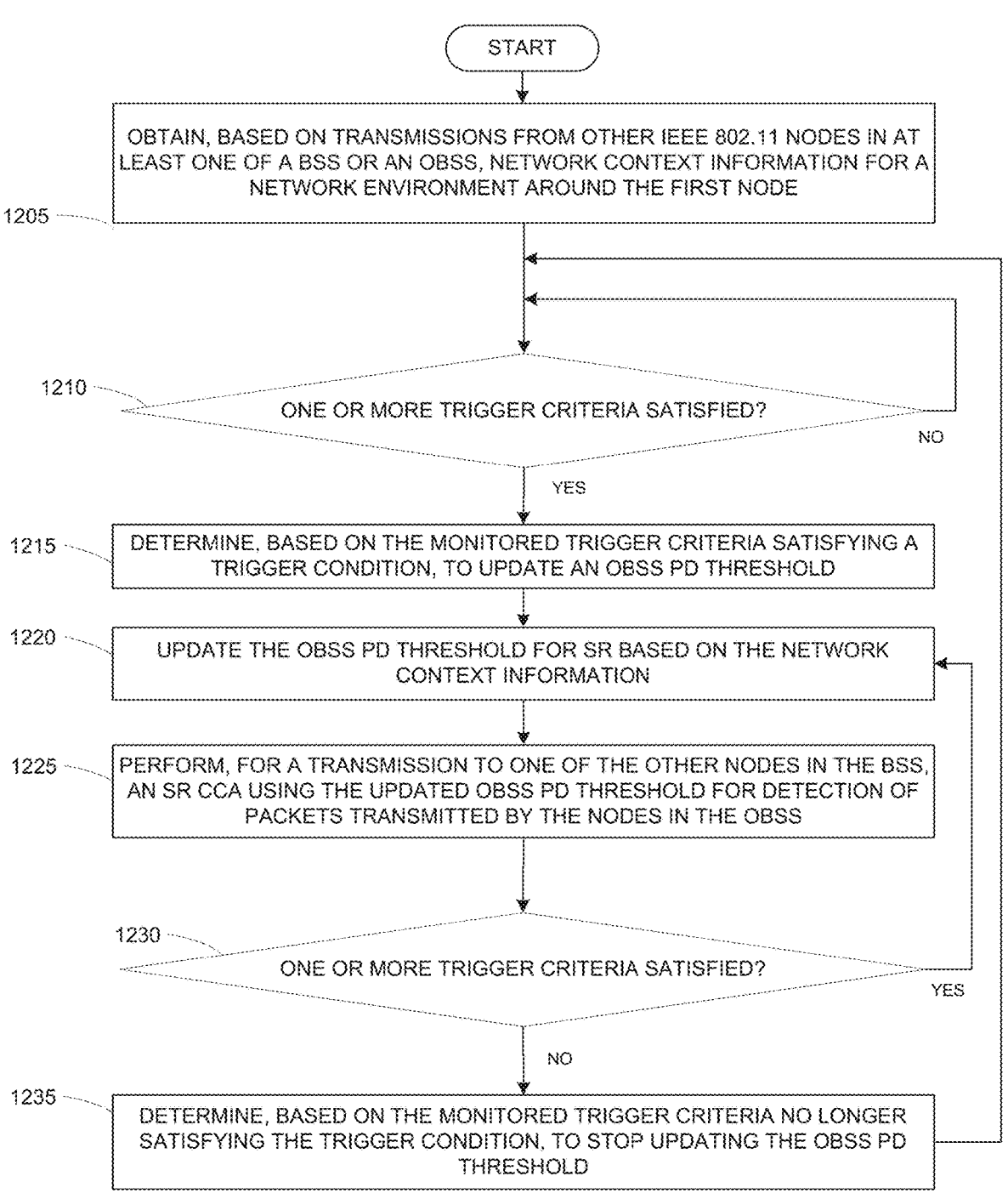
FIG. 12 illustrates an example process for reusing a channel medium that is in use by devices of a neighboring BSS (e.g., an OBSS) in a WLAN according to various embodiments of the present disclosure.

FIG. 12 illustrates an example process for reusing a channel medium that is in use by devices of a neighboring BSS (e.g., an OBSS) in a WLAN according to various embodiments of the present disclosure. The process of FIG. 12 is discussed as being performed by a first node (e.g., an IEEE 802.11 or WI-FI node) that could be an AP such as AP 101 or a STA such as STA 111, but it is understood that any suitable wireless communication device could perform the process.

Referring now to FIG. 12, beginning at step 1205 the first node obtains, based on transmissions from other IEEE 802.11 nodes in at least one of a BSS or an OBSS, network context information for a network environment around the first node. In some embodiments, the network context information is related to at least one of signal strength of the transmissions from the nodes of the OBSS, physical topology of the network environment around the first node, and a number of nodes in the OBSS from which transmissions are overheard.

Next, the first node monitors one or more trigger criteria (step 1210). In some embodiments, the trigger criteria are related to characteristics of traffic generated by the first node, characteristics of channel utilization by the first node or the other nodes in the BSS or OBSS, or both.

Next, the first node determines, based on the monitored trigger criteria satisfying a trigger condition, to update an OBSS PD threshold (step 1215). In some embodiments, step 1215 is performed before step 1205 such that the network context information is obtained after the determination to update the OBSS PD threshold. In some embodiments, the network context information is obtained periodically regardless of whether the trigger condition is determined to be satisfied.

Next, the first node updates the OBSS PD threshold for SR based on the network context information (step 1220). In some embodiments, the OBSS PD threshold is updated to maximize channel access for the first node when performing an SR CCA, as described below. In some embodiments, at step 1220 the first node updates a respective individual OBSS PD threshold for each of more than one OBSS for which packets are overheard by the first node.

Next, the first node performs, for a transmission to one of the other nodes in the BSS, an SR CCA using the updated OBSS PD threshold for detection of packets transmitted by the nodes in the OBSS (step 1225). In embodiments in which the first node updates individual OBSS PD thresholds, the first node performs the SR CCA using the respective individual OBSS PD threshold for detection of packets transmitted by the nodes in the respective OBSS.

In some embodiments, the first node may next determine that the monitored trigger criteria no longer satisfy the trigger condition (step 1230). In such embodiments, the first node periodically updates the OBSS PD threshold (e.g., by periodically performing step 1220) based on updated network context information until the determination at step 1230 that the monitored trigger criteria no longer satisfy the trigger condition, at which point the first node may stop updating the OBSS PD threshold (step 1235). The first node may then continue to monitor the trigger criteria (e.g., by performing step 1210) to determine whether the trigger criteria are once again fulfilled.

The above flowchart illustrates an example method that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of wireless communication performed by a first-node in a basic service set (BSS), the method comprising:

obtaining, based on transmissions from at least one of other nodes in the BSS or nodes in an overlapping BSS (OBSS), network context information for a network environment around the first node, the network context information being related to at least one of signal strength of the transmissions from the nodes of the OBSS, physical topology of the network environment, or a number of the nodes in the OBSS from which the transmissions are overheard;

updating an OBSS packet detection (PD) threshold for spatial reuse (SR) based on the network context information;

applying fairness tuning on the updated OBSS PD threshold based on a frequency with which OBSS physical layer protocol data units (PPDUs) include signaling prohibiting SR transmissions parallel to the OBSS PPDUs; and performing, for a transmission to one of the other nodes in the BSS, an SR clear channel assessment (CCA) using the updated and fairness-tuned OBSS PD threshold for detection of packets transmitted by the nodes in the OBSS.

2. The method of claim 1, wherein the OBSS PD threshold is updated to maximize channel access for the first node when performing the SR CCA.

3. The method of claim 1, further comprising:

monitoring one or more trigger criteria; and determining, based on the monitored trigger criteria satisfying a trigger condition, to update the OBSS PD threshold.

4. The method of claim 3, further comprising:

determining that the monitored trigger criteria no longer satisfy the trigger condition; and periodically updating the OBSS PD threshold based on the network context information until the determination that the monitored trigger criteria no longer satisfy the trigger condition.

5. The method of claim 3, wherein the trigger criteria are related to characteristics of traffic generated by the first node.

6. The method of claim 3, wherein the trigger criteria are related to characteristics of channel utilization by the first node or the other nodes in the BSS or OBSS.

7. The method of claim 3, wherein the network context information is obtained after the determination to update the OBSS PD threshold.

8. The method of claim 3, wherein the network context information is obtained periodically regardless of whether the trigger condition is determined to be satisfied.

9. The method of claim 1, further comprising:

updating a respective individual OBSS PD threshold for each of more than one OBSS for which packets are overheard by the first node; and performing the SR CCA using the respective individual OBSS PD threshold for detection of packets transmitted by the nodes in the respective OBSS.

10. The method of claim 1, wherein the first node is an access point (AP) in the BSS.

11. The method of claim 1, wherein the first node is a station (STA) in the BSS.

12. A station (STA) in a basic service set (BSS), the STA comprising:

a transceiver configured to obtain, based on transmissions from at least one of other nodes in the BSS or nodes in an overlapping BSS (OBSS), network context information for a network environment around the STA, the network context information being related to at least one of signal strength of the transmissions from the nodes of the OBSS, physical topology of the network environment around the STA, or a number of nodes in the OBSS from which transmissions are overheard; and a processor operably coupled to the transceiver, the processor configured to update an OBSS packet detection (PD) threshold for spatial reuse (SR) based on the network context information and apply fairness tuning on the updated OBSS PD threshold based on a frequency with which OBSS physical layer protocol data units (PPDUs) include signaling prohibiting SR transmissions parallel to the OBSS PPDUs, wherein the transceiver is further configured to perform, for a transmission to one of the other nodes in the BSS, an SR clear channel assessment (CCA) using the updated and fairness-tuned OBSS PD threshold for detection of packets transmitted by the nodes in the OBSS.

13. The STA of claim 12, wherein the OBSS PD threshold is updated to maximize channel access for the STA when performing the SR CCA.

14. The STA of claim 12, wherein the processor is further configured to:

monitor one or more trigger criteria; and determine, based on the monitored trigger criteria satisfying a trigger condition, to update the OBSS PD threshold.

15. The STA of claim 14, wherein the processor is further configured to:

determine that the monitored trigger criteria no longer satisfy the trigger condition; and periodically update the OBSS PD threshold based on the network context information until the determination that the monitored trigger criteria no longer satisfy the trigger condition.

16. The STA of claim 14, wherein the trigger criteria are related to characteristics of traffic generated by the STA.

17. The STA of claim 14, wherein the trigger criteria are related to characteristics of channel utilization by the STA or the other nodes in the BSS or OBSS.

18. The STA of claim 14, wherein:

the network context information is obtained after the determination to update the OBSS PD threshold, or the network context information is obtained periodically regardless of whether the trigger condition is determined to be satisfied.

* * * * *